United States Patent Office 3,333,002
Patented July 25, 1967

3,333,002
DIHALOHEXAFLUOROCYCLOHEXENONES
Richard F. Sweeney, Randolph Township, Morris County, and Louis G. Anello, Basking Ridge, N.J., Melvin M. Schlechter, Merrick, N.Y., and Benjamin Veldhuis, Morris Township, Morris County, N.J., assignors to Allied Chemical Corporation, New York, N.Y., a corporation of New York
No Drawing. Filed June 5, 1964, Ser. No. 373,058
14 Claims. (Cl. 260—586)

This invention relates to the production of novel dihalohexafluorocyclohexenones.

This group of compounds is useful as insecticides, leather and textile treating agents, and as intermediates in the preparation of insecticides, miticides, herbicides, synthetic resins and polymers, dyes, medicines, and leather treating agents. Specific utilities for species of this group will be referred to hereinafter.

One object of this invention is to provide a new group of chemical compounds, dihalohexafluorocyclohexenones. Another object is to provide novel processes for the preparation of these compounds. Other objects and advantages of the invention will be apparent herein after.

In accordance with the invention, the dihalohexafluorocyclohexenones having the formula:

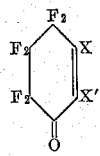

wherein X and X′ are selected from the group consisting of chlorine and fluorine, are prepared by reacting dihalooctafluorocyclohexenes or dihalohexafluorocyclohexanones having the formulas:

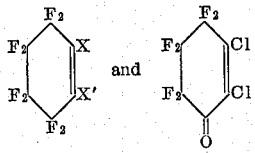

respectively, wherein X and X′ are the same as above, with various compounds in the presence of various catalysts, the selected reactants and catalyst depending on the species desired.

The four species which fall within the genus having the formula:

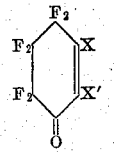

wherein X and X′ are selected from the group consisting of chlorine and fluorine, are as follows:

(1) 1,2-dichlorohexafluorocyclohexenone-3, having the formula:

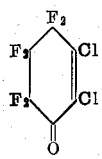

(2) Octafluorocyclohexenone-3, having the formula:

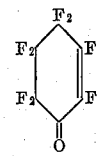

(3) 1-chloroheptafluorocyclohexenone-3, having the formula:

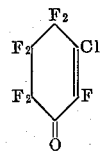

and
(4) 2-chloroheptafluorocyclohexenone-3, having the formula:

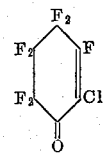

1,2-dichlorohexafluorocyclohexenone-3 finds specific utility as an intermediate in the preparation of amines pursuant to the process shown in the copending application of Gilbert and Veldhuis, Serial No. 373,056, filed June 5, 1964. These amines are useful as insecticides, miticides, and herbicides. The latter utility is shown in another copending application of Gilbert and Veldhuis, Serial No. 373,036, filed June 5, 1964. 1,2-dichlorohexafluorocyclohexenone-3 is prepared by reacting 1,2-dichlorooctafluorocyclohexene, having the formula:

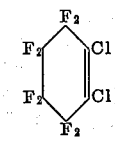

with sulfur trioxide ($SO_3$) in the presence of a catalyst selected from the group consisting of boron compounds and pentavalent antimony compounds.

Octafluoroocyclohexenone-3, is prepared by reacting decafluorocyclohexene, having the formula:

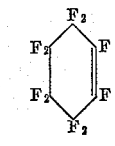

using the same reaction as set forth for 1,2-dichlorohexafluorocyclohexenone-3, supra.

1-chloroheptafluorocyclohexenone-3 is also prepared by reacting 1-chlorononafluorocyclohexene having the formula:

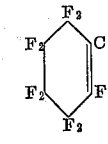

using the same reaction as set forth for 1,2-dichlorohexafluorocyclohexenone-3, supra.

The compound, 2-chloroheptafluorocyclohexeneone-3, is prepared by reacting 1,2-dichlorohexafluorocyclohexenone-3 with hydrogen fluoride in the presence of a chromium oxide compound catalyst.

The preparation of 1,2-dichlorohexafluorocyclohexenone-3 can be carried out as follows:

1,2-dichlorooctafluorocyclohexene (B.P. 111–113° C.) $SO_3$, (in solid or liquid form), and the catalyst are admixed in a reaction vessel, such as a glass-lined reaction chamber, which can be equipped with a reflux condenser, stirring means, and heating means. Although the reaction can be carried out by using stoichiometric quantities of the reactants or from about 0.5 to about 20 mols of $SO_3$ per mol of olefin, greater efficiency and higher yields are obtained when about 4 moles of $SO_3$ per mol of olefin are employed. The employment of a molar ratio substantially below about 4 mols of $SO_3$ per mol of 1,2-dichlorooctafluorocyclohexene results in an increase in the percentage of unreacted 1,2-dichlorooctafluorocyclohexene, whereas an amount of $SO_3$ in excess of about 6 mols produces no additional yield.

The catalyst can be present in a range of about 0.01% to about 10%. The preferred range is about 0.1% to about 5%. Percentages of the catalyst are by weight based on the weight of $SO_3$. The whole amount can be added initially or a portion initially and the balance during the reaction. Examples of the boron compound catalyst, which can be used, are boric oxide, trimethylboroxine, borax, sodium and potassium fluoborates, methyl borate, boric bromide, boric iodide, boric carbide, boric chloride, boric fluoride, boric hydride, boric nitride, boric silicide, and boric sulfide. Boric oxide is preferred. Examples of the pentavalent antimony compounds, which can be used, are antimony pentachloride, antimony pentafluoride, antimony pentabromide, and antimony pentaiodide.

The temperature of the reaction can be varied over a wide range from about 0° to about 100° C.; however, the reaction is preferably conducted at temperatures of about 20° to about 80° C. The operation can be carried out under atmospheric pressure, which is preferable and most practical. The time of the reaction can be from about ¼ to about 50 hours and is preferably from about 1 hour to about 2 hours. An excess of water can then be added to the reaction mixture, resulting in the separation of an oily layer. The oily layer is removed, dried, and 1,2-dichlorohexafluorocyclohexenone-3 (B.P. 135°–140° C.) can be conveniently separated by fractional distillation.

The preparation of octafluorocyclohexenone-3 or 1-chloroheptafluorocyclohexenone-3 is similar to that for the preparation of 1,2-dichlorohexafluorocyclohexenone-3, described supra.

The reactant, i.e., decafluorocyclohexene (B.P. 52°–53° C.) or 1-chlorononafluorocyclohexene (B.P. 81°–82° C.) selected according to the product desired, can be introduced into a glass-lined stainless steel bomb or other pressure-resistant reaction vessel, together with $SO_3$ (in solid or liquid form) and a boron or pentavalent antimony compound catalyst, examples of which were previously set forth. Because of the low boiling point of decafluorocyclohexene and 1-chlorononafluorocyclohexene, the reaction is preferably conducted in a closed system to avoid the volatilization of these initial reactants at the temperatures utilized to effect the reaction since the lower limit of temperature for this reaction is higher than that used in the preparation of 1,2-dichlorohexafluorocyclohexenone-3. The pressure built up in the closed system can range from above atmospheric pressure to about 1000 p.s.i. It is preferable to control the pressure in this range by the use of an inert gas such as nitrogen. Excess $SO_3$ can also be employed instead of the inert gas, however, this provides the additional problem of separation of such excess, which is avoided with the inert gas.

This reaction is desirably conducted under anhydrous conditions since water interferes therewith, causing various side reactions.

The reaction mixture can then be heated on a steam bath or by other heating means. The reaction is conducted within a temperature range of from about 50° to about 600° C., and is preferably conducted in a temperature range from about 75° to about 200° C. The optimum temperature is from 90° to 120° C., and the preferred mode of heating the reaction mixture is on the steam bath.

The amount of reactants and catalyst are the same as used in the preparation of 1,2-dichlorohexafluorocyclohexenone-3. The time of the reaction is also similar to that used in the preparation of 1,2-dichlorohexafluorocyclohexenone-3, except that the preferred time is from about 10 to about 20 hours.

As in the preparation of 1,2-dichlorohexafluorocyclohexenone-3, an excess of water can be added to the reaction mixture, which results in the separation of an oily layer. For best results, it is preferable to distill the oily layer from concentrated sulfuric acid to give the desired product, i.e., octafluorocyclohexenone-3 or 1-chloroheptafluorocyclohexenone-3.

The preparation of 2-chloroheptafluorocyclohexenone-3 is quite different from that of the other species.

The catalyst, $Cr_2O_3$, is preferably placed in a reaction vessel, optionally equipped with heating means, before the reactants are introduced. Particularly effective $Cr_2O_3$ catalysts are those disclosed in the copending application of Louis G. Anello and Cyril Woolf, Ser. No. 226,447, filed September 26, 1962, now United States Patent 3,235,612. The reaction vessel can be made of nickel or other non-corrosive material such as "Monel" or "Inconel." The vessel is heated to the desired temperature and then the reactants, i.e., 1,2-dichlorohexafluorocyclohexenone-3 and hydrogen fluoride, which is preferably anhydrous, are introduced into the reaction vessel in such a manner that the reaction mixture, which enters the vapor phase, is passed over and in contact with the bed of catalyst, for a brief period of time. Although the contact time is not critical, it generally ranges from about one second to about five minutes.

The temperature used can be in the range of about 250° to about 600° C. and is preferably from about 350° to about 450° C. The reaction time is that required for the reaction mixture to pass over the catalyst bed and depends on the size of the bed of catalyst and the amount of reactants involved. If there is a small amount of catalyst available, the reactants can be recycled to insure proper contact of the reaction vapors with the catalyst. The catalyst can be pelleted or in fluid bed form. No specific amounts of catalyst is required; however, a great amount of catalyst will result in a shorter period of preparation.

The molar ratio of hydrogen fluoride to 1,2-dichlorohexafluorocyclohexenone-3 can be about 0.5:1 to about 10:1 and is preferably from about 1:1 to about 2:1.

As the reaction proceeds, it is preferable to pass the exit materials through a sodium fluoride scrubber, which removes unreacted hydrogen fluoride and hydrogen chloride. Distillation can be used in place of the sodium fluoride scrubber, if desired. The vapor, which contains the desired product, can then be condensed in a trap, cooled by various means such as a Dry-Ice/acetone mixture (approx. −78° C.).

The desired product, 2-chloroheptafluorocyclohexenone-3, can then be separated from the liquid mixture by fractional distillation.

The specific utility of 2-chloroheptafluorocyclohexenone-3 as an insecticidal fumigant is discussed infra.

The following examples illustrate the present invention. Parts and percentages are by weight.

EXAMPLE I

Fifty-nine parts of 1,2-dichlorooctafluorocyclohexene were mixed with 32 parts of $SO_3$ and 0.5 part $SbCl_5$ and the mixture was refluxed for ½ hour. The temperature of the mixture was 49° C. 0.7 part additional $SbCl_5$ was added and refluxing was continued for 1½ hours. The temperature then rose to 87° C. The reaction mixture was drowned in water, resulting in the separation of 51 parts of an oily layer which was removed and dried over anhydrous sodium sulfate. Fractional distillation gave 12 parts of 1,2-dichlorohexafluorocyclohexenone-3, (B.P. 135°–140° C.).

Infrared spectrographic analysis showed a carbonyl absorption band at 5.7 microns and the absorption band for ClC=CCl at 6.3 microns. Elemental analysis showed: Hydrogen: theoretical: 0, found: 0; Fluorine: theoretical: 41.7%, found: 41%. A further confirmation of structure was obtained by reaction with aromatic amines to yield derivatives as shown in copending applications, Ser. Nos. 373,056 and 373,036, which are referred to in column 2, supra.

EXAMPLE II

Fifty-nine parts of 1,2-dichlorooctafluorocyclohexene are mixed with 32 parts of $SO_3$ and 2 parts of $B_2O_3$ and the mixture is refluxed for about 2 hours. The temperature of the mixture rises from about 49° C. to about 87° C. The reaction mixture is then drowned in water resulting in the separation of an oily layer which is removed and dried over anhydrous sodium sulfate. Fractional distillation gives about 6 parts of 1,2-dichlorohexafluorocyclohexenone-3.

EXAMPLE III

A glass-lined stainless steel bomb was charged with 26.2 parts of decafluorocyclohexene, 8 parts of $SO_3$, and 0.1 parts of antimony pentafluoride. The bomb was sealed and dry nitrogen was passed in to give a pressure of 500 p.s.i. The bomb was heated for 16 hours on a steam bath. At the end of this 16 hour period, the infrared absorption spectra reaction mixture indicated conversion to the ketone. The reaction mixture was then treated with 3.6 parts of water and the organic layer was separated. Upon distillation from concentrated sulfuric acid, the organic layer gave two fractions as follows:

| Fraction | Boiling Range, ° C. | Parts |
|---|---|---|
| 1 | 55–75 | 14 |
| 2 | 85–95 | 2.6 |

Both fractions showed a carbonyl absorption at 5.7 microns. Fraction No. 1 was re-distilled with an 18″ spinning band column to remove the decafluorocyclohexene starting material. The balance of fraction No. 1 was combined with fraction No. 2 and the mixture was stirred with 25 parts of water at room temperature. The water layer was added to excess sulfuric acid and distilled to give 0.75 parts of octafluorocyclohexeneone-3 (B.P. 70–74° C.).

EXAMPLE IV

A glass-lined stainless steel bomb was charged with 27.9 parts of 1-chlorononafluorocyclohexene, 19.2 parts of $SO_3$, and 0.2 parts of antimony pentafluoride. The bomb was sealed and dry nitrogen was passed in to give a pressure of 500 p.s.i. The bomb was heated for 16 hours on a steam bath. At the end of this period, the infrared absorption spectra of the reaction mixture indicated conversion to ketone. The reaction mixture was then treated with excess water and the organic layer, upon distillation from concentrated sulfuric acid gave the following fractions:

| Fraction | Boiling Range, ° C. | Parts |
|---|---|---|
| 1 | 82–144 | 8.8 |
| 2 | 144–170 | 6.7 |
| 3 | 170–180 | 2.2 |

Hydrogen fluoride was evolved during the distillation. Two phases appeared in fractions 2 and 3, one of which was water-white and the other phase a light yellow oil. Fraction 1 and the water-white portion of fractions 2 and 3, were combined and distilled from concentrated sulfuric acid on an 18″ spinning band column to give 1.6 parts of 1-chloroheptafluorocyclohexenone-3, (B.P. 100–104° C.).

EXAMPLE V

About 521 parts of a $Cr_2O_3$ catalyst were charged into a ½ I.D. tubular nickel reactor externally heated over about 30″ of length by an electric furnace provided with an automatic control, the material being disposed in a central 20″ long length of the reactor. The internal temperature of the reactor was raised to about 400° C. and a mixture consisting of about 119 parts of 1,2-dichlorohexafluorocyclohexenone-3 and 60 parts of anhydrous hydrogen fluoride were reacted during a period of 5¾ hours passing the mixture over and in contact with the catalyst. Exit materials from the reactor were passed through a sodium fluoride scrubber, which removed any unreacted hydrogen fluoride and hydrogen chloride. The organic product was then condensed in a Dry-Ice/acetone mixture cooled trap. Fractional distillation of the cold trap liquid effected recovery of 16 parts of 2-chloroheptafluorocyclohexenone-3.

As indicated above, the novel group of compounds are useful as insecticides. One, especially, 2-chloroheptafluorocyclohexenone-3, find valuable application as an active insecticidal fumigant. The fumigant is used in combatting infestation in flour and grain contained in storage bins, grain elevators and the like, and in combatting plant insects.

The preferred mode of using the compound of this invention is to enclose the area to be fumigated and expose such area to the compound, which vaporizes and permeates the atmosphere. Since the vapor is heavier than air, it tends to sink to the bottom of the bin or elevator, penetrating the flour or grain as it settles. The compound may be used by itself and placed in an open container or on an absorbent in the designated area. In the tests shown infra, 0.02 to 0.1 cc. of compound per gallon jar, or 5.1 to 25.4 fluid ounces of compound per 1000 cubic feet of space were used. The preferred range is about 1 fluid ounce of compound per 1000 cubic feet to about 30 fluid ounces of compound per 1000 cubic feet, but the upper limit is unrestricted except by bounds of practicality.

The novel compound, 2-chloroheptafluorocyclohexenone-3, was tested for insecticidal fumigant properties as follows:

TABLE I

| Insect* | Concentration (cc.) | Exposure Time (hrs.) | Days After Exposure | Percent Kill |
|---|---|---|---|---|
| HFP | .05 | 24 | 0 | 100 |
| CFB | 0.1 | 24 | 6 | 100 |
| CFB | .02 | 24 | 8 | 100 |
| LMWA | 0.1 | 24 | 6 | 100 |
| LMWA | 0.2 | 24 | 8 | 100 |
| LMWA | .02 | 2 | 6 | 100 |
| BCBL | 0.1 | 24 | 6 | 100 |
| BCBL | .02 | 24 | 8 | 100 |
| YMW | 0.1 | 24 | 6 | 100 |
| YMW | .02 | 24 | 8 | 100 |

*HFP=House fly pupae.
CFB=Confused flour beetles.
LMWA=Lesser mealworm adults.
BCBL=Black carpet beetle larvae.
YMW=Yellow mealworms.

The method used for the fumigant test in Table I was as follows:

Test insects were placed in 1.5″ diameter salve tins with perforated lids. A small amount of appropriate food (grain, flour, ground dog food, etc.) was placed in each tin. The above dosages were placed on a Cellucotton wad or in a small container, in a gallon Mason jar. As soon as the insect containers and the compound are introduced, the jar is sealed. After exposure, mortality counts are made in the tests noted in Table I, above. The mortality count made 0 days after exposure includes the period up to 24 hours immediately after exposure.

We claim:

1. A compound having the formula:

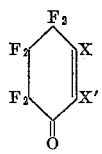

wherein X and X' are selected from the group consisting of chlorine and fluorine.

2. A compound according to claim 1 having the formula:

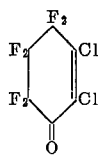

3. A compound according to claim 1 having the formula:

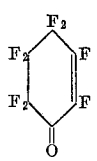

4. A compound according to claim 1 having the formula:

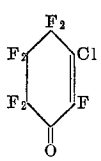

5. A compound according to claim 1 having the formula:

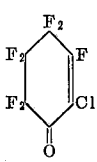

6. A process for preparing a compound having the formula:

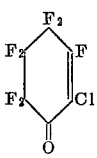

comprising reacting a compound having the formula:

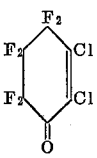

with hydrogen fluoride in the presence of a $Cr_2O_3$ catalyst at a temperature in the range of about 250° to about 600° C., and recovering the resulting 2-chloroheptafluorocyclohexenone-3 by fractional distillation.

7. A process according to claim 6, wherein the temperature is from about 350° to 450° C.

8. A process for preparing a halocyclohexenone-3 compound having the formula:

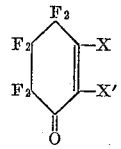

wherein X and X' are both fluorine atoms or both chlorine atoms, or X is a chlorine atom and X' is a fluorine atom, comprising reacting a compound of the formula:

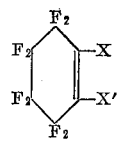

wherein X and X' are as defined above, with sulfur trioxide in the presence of a catalyst selected from the group consisting of boric oxide, trimethylboroxine, borax, sodium and potassium fluoborates, methyl borate, boric bromide, boric iodide, boric carbide, boric chloride, boric fluoride, boric hydride, boric nitride, boric silicide, boric sulfide and pentavalent antimony halides, and recovering the resulting halocyclohexenone-3 by fractional distillation.

9. A process according to claim 8, wherein X and X' are both chlorine atoms.

10. A process according to claim 8, wherein X and X' are both fluorine atoms.

11. A process according to claim 8, wherein X is a chlorine atom and X' is a fluorine atom.

12. A process according to claim 8, wherein the catalyst is boron oxide.

13. A process according to claim 8, wherein the catalyst is pentavalent antimony halide.

14. A process according to claim 8 wherein the reaction mixture is treated with water, the water separated and thereafter recovering the resulting halocyclohexenone-3 by fractional distillation.

References Cited

UNITED STATES PATENTS

| | | | |
|---|---|---|---|
| 2,408,389 | 10/1946 | Gertler | 167—30 |
| 2,420,271 | 5/1947 | Travis | 167—30 |
| 2,657,126 | 10/1953 | Standen | 260—586 |
| 3,050,561 | 8/1962 | Brill | 260—586 |
| 3,056,802 | 10/1962 | Phillips | 260—586 X |
| 3,070,629 | 12/1962 | Ohloff | 260—586 |
| 3,235,612 | 7/1965 | Anello et al. | 260—653.7 |

OTHER REFERENCES

Lovelace et al.: "Aliphatic Flourine Compounds," pp. 12 and 16 (1958).

Remy: "Treatise on Inorganic Chemistry," vol. II, p. 135 (1956).

LEON ZITVER, *Primary Examiner.*

M. M. JACOBS, J. D. GOLDBERG,

*Assistant Examiners.*